United States Patent [19]

Pelikan

[11] Patent Number: 4,501,158
[45] Date of Patent: Feb. 26, 1985

[54] LIQUID FLOW INDICATOR AND VALVE DEVICE

[76] Inventor: Robert W. Pelikan, 245 Alvarado Ave., Los Altos, Calif. 94022

[21] Appl. No.: 518,367

[22] Filed: Jul. 29, 1983

[51] Int. Cl.³ .............................................. G01F 1/26
[52] U.S. Cl. ................................................. 73/861.58
[58] Field of Search ............ 73/861.54, 861.55, 861.58

[56] References Cited

U.S. PATENT DOCUMENTS

| | | | |
|---|---|---|---|
| 1,187,607 | 6/1916 | Carney et al. | 73/861.58 |
| 1,513,016 | 10/1924 | St. John | 73/861.58 |
| 2,069,309 | 2/1937 | Hensey | 73/861.54 |
| 3,744,313 | 7/1973 | Thompson | 73/861.54 |
| 4,315,436 | 2/1982 | McCabe | 73/861.54 |

FOREIGN PATENT DOCUMENTS 1190912  5/1970  United Kingdom .

Primary Examiner—Herbert Goldstein
Attorney, Agent, or Firm—Gary M. Polumbus

[57] ABSTRACT

A liquid flow indicator includes means for indicating a flow of liquid therethrough, measuring the rate of flow of liquid therethrough, and selectively functioning as a one-way valve. The device includes a housing which is placed in a liquid flow conduit so that all liquid in the conduit flows through the housing whereby a float disposed in the housing is allowed to be displaced from a closed seated position wherein it selectively blocks the reverse flow of liquid through the housing to one of a plurality of open positions wherein it allows the forward flow of liquid through the housing. The amount of displacement of the float is discernible by calibrated indicia carried on the float and the housing so that not only the indication of a flow of liquid through the device is indicated, but also the rate of flow of that liquid.

2 Claims, 5 Drawing Figures

LIQUID FLOW INDICATOR AND VALVE DEVICE

BACKGROUND OF THE INVENTION

1. Field of the Invention

The present invention relates to flow indicators and valves for use in liquid carrying conduits, and more particularly, to a device for indicating the presence of a flow of liquid, the rate of that flow, and providing valve means for preventing the reverse flow of the liquid.

2. Description of the Prior Art

The use of flow indicators, flow meters and check valves in liquid carrying conduits is well known in the art and each such device provides a specific function. The flow indicators indicate the presence of a flow of liquid through a given conduit, the flow meters indicate the rate of flow of liquid through the conduit, and the check valves stop the flow of liquid in a given direction.

To Applicant's knowledge, there are no devices which have been developed for performing all three functions, and numerous needs for such a device exist in industries utilizing liquid flow conduits. An example of such a need is in the solar industry wherein a heat transfer liquid transfers heat from the collector to a storage tank by circulating the liquid in a closed fluid conduit through the collector and a heat exchanger in the storage tank.

In such solar systems, it is frequently desirable and/or necessary to make sure that the heat transfer fluid is circulating and that it is circulating at a desirable rate. Also, in some such solar systems, it is desirable to prevent reverse flow of the liquid and it is to achieve the above ends that the present invention was developed.

Accordingly, it is a primary object of the present invention to provide a device for use in liquid flow conduits which indicates the flow of liquid through the conduit, indicates the rate of flow of the liquid through the conduit, and provides a check valve for preventing the reverse flow of liquid through the conduit, if desired.

SUMMARY OF THE INVENTION

The present invention is designed to be placed in-line with a liquid flow conduit, so that the liquid flowing through the conduit passes through the device. The device includes a housing in which a float is positioned for movement between a closed position wherein it may prevent the reverse flow of liquid through the housing, and a plurality of open positions allowing various flow rates through the device. The float is biased into its closed position and may be provided with a seal to prevent the reverse flow of liquid through the device with the biasing means yieldingly resisting displacement of the valve into its open positions. Any displacement of the float from its closed position indicates that a flow of liquid through the device exists and the rate of flow of liquid through the device is determined by the amount of displacement which is readily determinable by indicia carried on the float and a clear portion of the housing which have been calibrated to give a reader a very close determination of the flow rate.

The device, accordingly, is not only adapted to function as a check valve, but also to indicate the presence of a flow of liquid therethrough, and the rate of that flow.

DESCRIPTION OF THE PREFERRED EMBODIMENT

Figure 1:
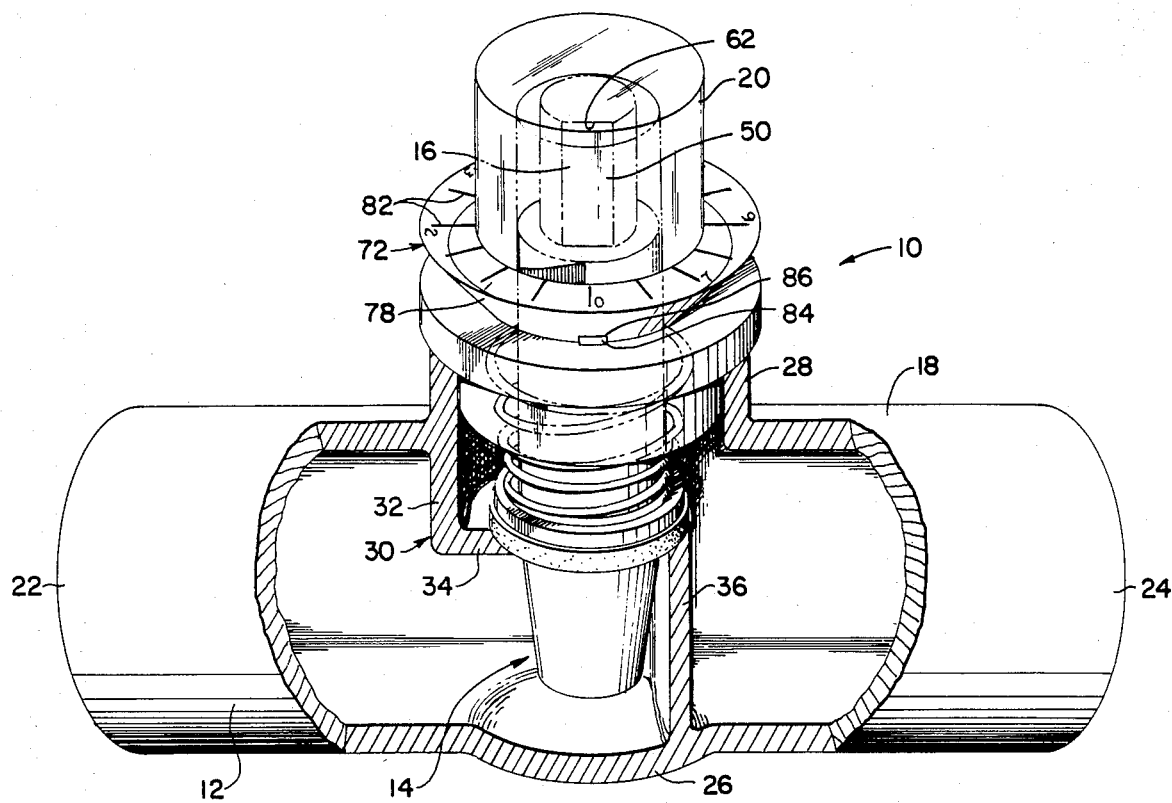
FIG. 1 is a perspective view of the device of the present invention with parts removed.
Figure 2:
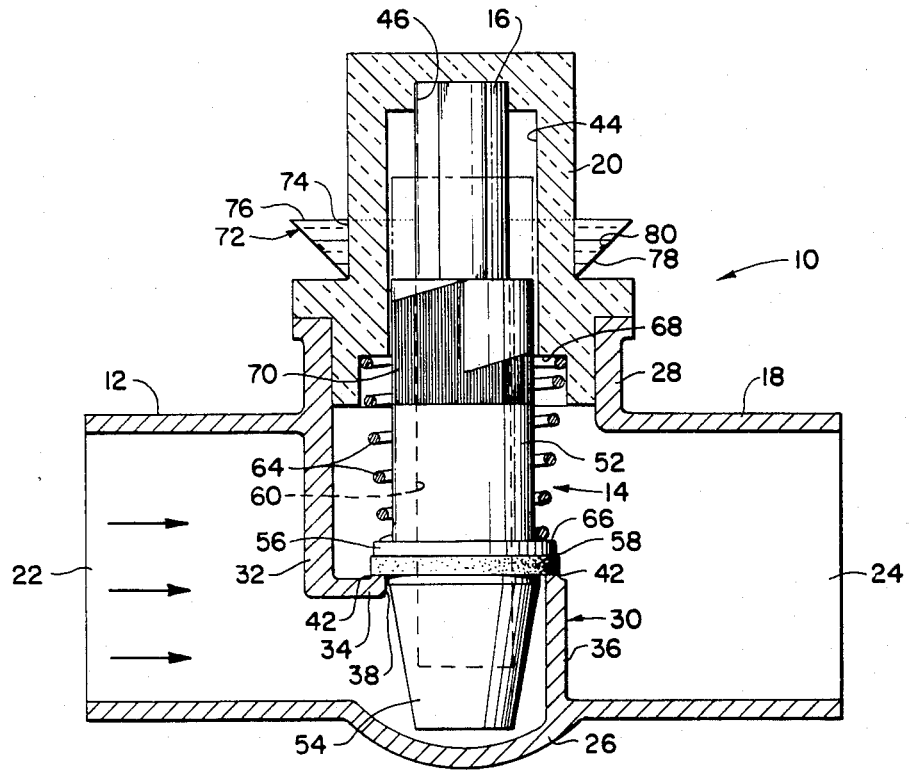
FIG. 2 is a longitudinal vertical section taken through the device shown in FIG. 1.

The liquid flow indicator and valve device 10 of the present invention can be seen in the drawing to include a housing 12 and a float member 14 disposed in the housing on a guide pin 16 for allowing the movement of liquid through the device in a forward direction, but selectively preventing the flow of liquid in a reverse direction, while indicating the existence of a forward flow of liquid and the rate of that flow.

The housing 12 consists of two component parts, a main body member 18 and a clear cap 20. The main body member 18 is generally cylindrical in configuration, having an inlet end 22 and an outlet end 24 of circular configuration adapted to be joined in fluid-tight relationship with a fluid flow conduit (not shown), whereby fluid flowing in the conduit would enter the inlet end 22 of the main body and exit through the outlet end 24 of the main body. At the center of the main body along a bottom surface thereof is a segmented spherical surface 26 lowering the bottom of the main body at that location to accomodate movement of the float 14 in a manner to be described later. A raised cylindrical wall 28 defines a circular opening through the top of the main body 18 at its longitudinal center and forms a juncture location for joinder of the clear cap 20 to the main body in a manner to be described later.

A generally Z-shaped plate 30 extends transversely of the main body at its longitudinal center, defining an upper vertical wall 32, a horizontal wall 34, and a lower vertical wall 36, with the lower vertical wall being connected to the segmented spherical surface 26 of the main body and the upper vertical wall 32 being connected in-line with one side of the raised cylindrical wall 28. The horizontal wall 34 of the Z-shaped plate has a circular opening therethrough with an upturned flange around the perimeter of that opening.

The Z-shaped plate 30 can therefore be seen to define a passageway through the main body 18 which forces the liquid flowing through the body to pass upwardly through the circular opening 38 in the Z-shaped plate before exiting through the outlet end 24 of the main body. The main body 18 could be made of any suitable material, but a bronze material has been found to be an ideal substance from which to make the main body.

The clear cap portion 20 of the housing 12, which may be made of a clear plastic material, is generally cylindrical in configuration, having a flange portion 42 around its lower perimeter adapted to mate with the raised cylindrical wall 28 in the main body 18 and form a liquid-tight seal therewith. A suitable bonding medium may be used to effect the fluid-tight seal. The clear cap 20 forms a cylindrical cavity 44 therein in vertical alignment with the circular opening 38 through the horizontal wall 34 of the Z-shaped plate 30 to accommodate the float 14. A circular recess 46 is provided in the upper end of the clear cap 20 and receives the depending guide pin 16 which is secured in the recess to guide movement of the float. The guide pin, while being generally cylindrical in configuration, has a flattened side 50 for a purpose which will become clear later.

The float 14 consists of an enlongated body having a cylindrical upper portion 52 and a frustoconical lower portion 54 with a circular outwardly directed flange 56 separating the cylindrical portion from the frustoconical portion. A rubber washer 58 may be positioned immediately beneath the circular flange 56 immediately above the upper end of the frustoconical portion 54 to estaablish a liquid-tight seal with the upturned lip 40 around the circular opening through the horizontal wall 34 of the Z-shaped plate. The float has a substantially cylindrical axial recess 60 formed therein which opens through the top of the float but not the bottom, and it has a flat wall 62 corresponding with the flat side 50 on the guide pin 48 so that a mating relationship exists while allowing the float to slide vertically along the length of the guide pin. The guide pin, therefore, maintains an alignment of the float with the circular opening 38 through the horizontal wall 34 of the Z-shaped plate and prevents relative rotation of the float with respect to the other components of the device.

A coil spring 64 bridges the space between an upper surface 66 of the circular flange 56 on the float 14 and an internal circular shoulder 68 provided near the bottom of the clear cap 20 so as to bias the float into a closed seated position wherein the rubber washer 58 is engaged with the upturned lip 48 around the circular opening 38.

As will be appreciated, the flow of liquid into the inlet end 22 of the device will flow against the frustoconical portion 54 of the float 14 and pressure on the float will cause the float to slide upwardly along the guide pin 16 and against the bias of the coil spring 64 which yieldingly resists such movement to allow the liquid to flow through the circular opening 38 and subsequently through the outlet end 24 of the device. Accordingly, the coil spring yieldingly resists upward movement of the float, but allows such movement to allow the float to move upwardly into an infinite number of open positions for allowing various amounts of liquid to flow through the valve. When liquid is not flowing in a forward direction through the device, however, the coil spring holds the rubber washer against the lip 40 around the circular opening 38 to seal the opening and thereby prevent the reverse flow of liquid through the device, for a reason which will be explained later.

The upper half of the cylindrical portion 52 of the float has a generally spiral-shaped band of indicia 70 thereon, which indicia is preferably painted or otherwise placed on the float and is of a very distinct color from the color forming the float itself. As the float rises, this indicia 70 becomes visible through the cylindrical portion of the clear cap 20 and the more of the band that can be seen, the more liquid is being allowed to flow through the device, so that a direct and visual indication that liquid is flowing through the device is readily available by reference to the spiral band on the float.

Figure 4:
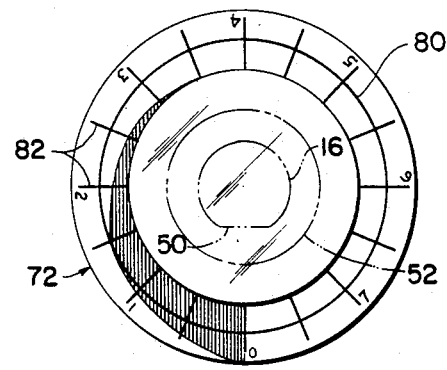
FIGS. 4 and 5 are diagrammatic top plan views illustrating the readout feature of the invention as it indicates flow rates.
Figure 5:
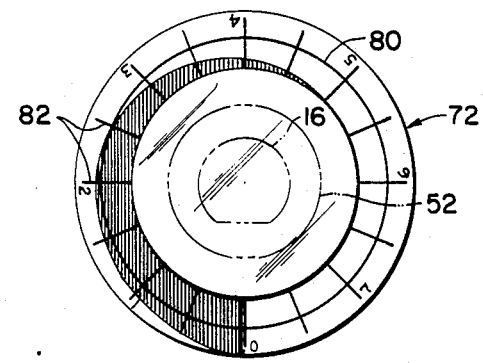
Figure 3:
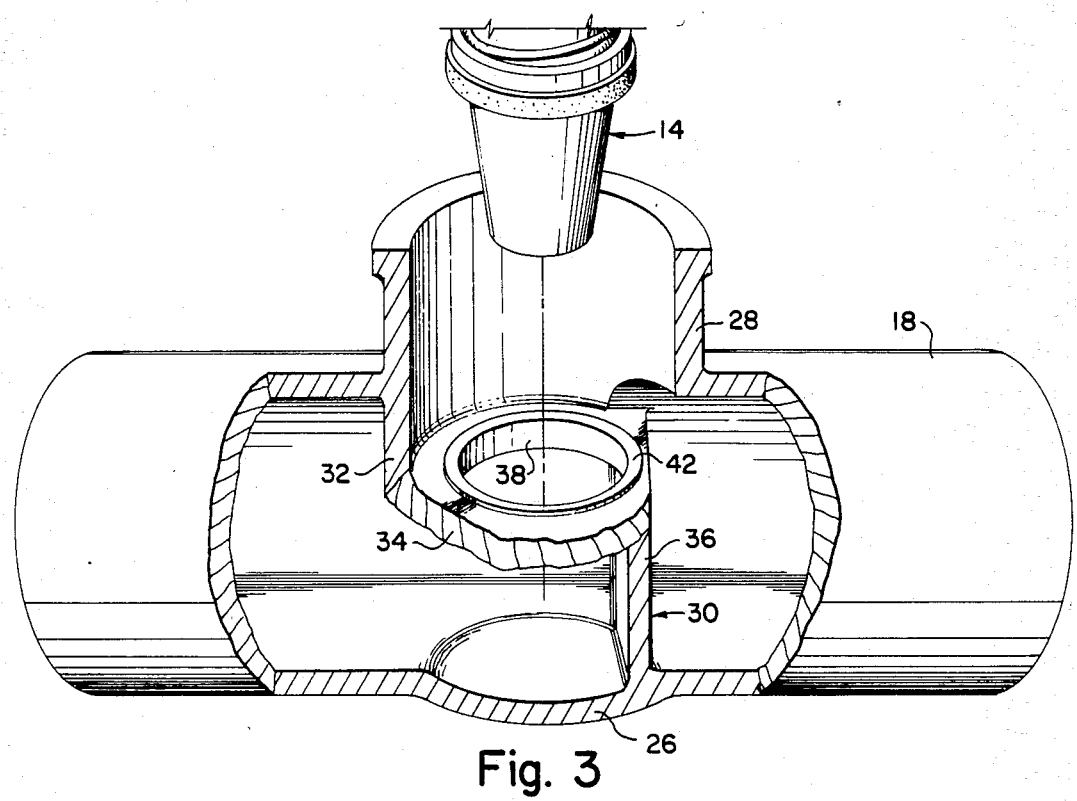
FIG. 3 is a partially exploded perspective view with parts removed similar to FIG. 1.

In order to measure the rate of flow of liquid through the device, a flow readout bezel 72 in the form of a ring disposed around the cylindrical portion of the clear cap 20 is provided. The flow readout bezel, while being ring-shaped, is of triangular transverse cross section, defining a circular cylindrical surface 74, a circular radial surface 76 perpendicular thereto, and a bevelled surface 78 interconnecting the cylindrical and radial surfaces at an angle of forty-five degrees. The flow readout bezel is made of a clear plastic material and the bevelled surface 78 is reflective so that an individual looking down on the device would have his vision reflected horizontally inwardly toward the guide pin 16 or float 14, depending on the absence or presence of liquid flowing through the device. The reflective surface of the flow readout bezel has a circular line 80 thereon (which may alternatively be on the circular cylindrical surface 74 or the circular radial surface 76), while the circular radial surface 76 has a plurality of calibrated radially oriented lines 82 so that an observer looking outwardly into the bezel can see the point at which the spiral band indicia 70 on the float crosses the circular line 80 on the bevelled surface of the readout bezel and relate that to one of the calibrated radial lines 82 on the radial surface 76 of the bezel which would indicate the rate of flow of liquid through the device (see FIGS. 4 and 5 indicating flow rates of $1\frac{1}{2}$ gpm and $2\frac{1}{2}$ gpm, respectively). The flow readout bezel is removably mounted on the clear cap so that the device could have the flow meter capability or not, as desired. A key 84 and key slot 86 are provided on the clear cap 20 and bezel 72 respectively, to maintain the proper relationship of the two parts when reassembled.

As mentioned previously, the rubber washer 58 on the float may not always be a desirable component and therefore can be left off. For example, if the device of the present invention is being used in a solar system in-line with the heat transfer fluid which passes through the collector and a heat exchanger in a storage tank in a closed line system, some such solar systems allow the fluid to drain out of the collector during cold periods to prevent freeze-up and, in such cases, a reverse flow through the device of the present invention would be desirable and would be permitted if the rubber washer were not used. In other systems, where an antifreeze solution is used as the heat transfer medium, such drainage is not necessary and, in fact, the closed line is completely full of liquid but it is necessary to prevent a reverse flow of that liquid which might transfer heat from the storage tank back to the collector where the heat could be dissipated and lost. In this type of system, the rubber washer 58 is necessary to prevent the reverse flow of liquid through the device.

The device of the present invention has been shown and described with a degree of specificity. It should be understood, however, that the specificity of the description has been made by way of preferred example and that the invention is defined by the scope of the appended claims.

What is claimed is:

1. A device for controlling the flow of liquids in a conduit comprising in combination:

housing means defining a path along which a flow of liquid is confined, said housing means including a clear portion, a float in said housing means visible through said clear portion of the housing means and being movable between a closed position wherein it blocks the flow of liquid in a reverse direction along said path and a plurality of open positions wherein it allows the flow of liquid in a forward direction along said path, and means associated with said float for indicating a forward flow of liquids through the device as well as the rate of forward flow of liquid, said means for indicating the rate of forward flow of liquids consisting of (a) indicia on said float which is visiable through said clear portion of the housing and is adapted to indicate the displacement of the float from its position, said displacement being proportional to the rate of flow of the liquid, and (b) a calibrated clear ring having an inner circular surface which is contiguous with said clear portion of the housing, a radial circular surface extending perpendicularly away from said inner circular surface, and a reflective beveled circular surface connecting said inner and radial circular surfaces, one of said inner and beveled circular surfaces having a circular indicia line there along and said radial circular surface having a plurality of calibrated radial lines thereon whereby an individual looking through said radial circular surface can see the indicia on said float via the beveled surface and the inner circular surface and determine the flow rate of liquid through the device by relating the indicia on the float to the calibrated indicia on the radial circular surface of the circular indicia line on one of said inner circular surface and beveled circular surface.

2. The device of claim 1 wherein said clear ring is removably mounted on the clear portion of said housing.

* * * * *